(12) United States Patent
Düll et al.

(10) Patent No.: US 9,639,070 B2
(45) Date of Patent: May 2, 2017

(54) CONTROLLING A TURBINE WITH A RECURRENT NEURAL NETWORK

(71) Applicant: SIEMENS AKTIENGESELLSCHAFT, München (DE)

(72) Inventors: Siegmund Düll, München (DE); Steffen Udluft, Eichenau (DE); Lina Weichbrodt, Berlin (DE)

(73) Assignee: Siemens Aktiengesellschaft, München (DE)

( * ) Notice: Subject to any disclaimer, the term of this patent is extended or adjusted under 35 U.S.C. 154(b) by 365 days.

(21) Appl. No.: 14/396,337

(22) PCT Filed: Apr. 8, 2013

(86) PCT No.: PCT/EP2013/057307
§ 371 (c)(1),
(2) Date: Oct. 22, 2014

(87) PCT Pub. No.: WO2013/160090
PCT Pub. Date: Oct. 31, 2013

(65) Prior Publication Data
US 2015/0110597 A1   Apr. 23, 2015

(30) Foreign Application Priority Data

Apr. 23, 2012   (DE) .............. 10 2012 206 651

(51) Int. Cl.
| | |
|---|---|
| G06F 19/00 | (2011.01) |
| G05B 13/02 | (2006.01) |
| F04D 27/00 | (2006.01) |
| G06N 3/04 | (2006.01) |

(52) U.S. Cl.
CPC ....... *G05B 13/0265* (2013.01); *F04D 27/001* (2013.01); *G05B 13/027* (2013.01); *G06N 3/04* (2013.01)

(58) Field of Classification Search
CPC .... G05B 13/0265; G05B 13/027; G06N 3/04; F04D 27/001
See application file for complete search history.

(56) References Cited

U.S. PATENT DOCUMENTS

| | | | | |
|---|---|---|---|---|
| 5,857,321 | A | * | 1/1999 | Rajamani ................ F02C 9/28 60/39.24 |
| 8,065,022 | B2 | * | 11/2011 | Minto .................... F01D 11/20 60/350 |
| 8,099,181 | B2 | | 1/2012 | Sterzing et al. |
| 8,554,707 | B2 | | 10/2013 | Schafer et al. |
| 2010/0070098 | A1 | | 3/2010 | Sterzing et al. |
| 2010/0094788 | A1 | | 4/2010 | Schafer et al. |
| 2010/0100248 | A1 | * | 4/2010 | Minto .................... F01D 11/20 700/287 |
| 2013/0013543 | A1 | | 1/2013 | Dull et al. |
| 2015/0110597 | A1 | * | 4/2015 | Dull ........................ G06N 3/04 415/1 |
| 2016/0063393 | A1 | * | 3/2016 | Ramage ................ H04L 67/42 706/12 |

FOREIGN PATENT DOCUMENTS

| | | |
|---|---|---|
| DE | 102007001024 A1 | 7/2008 |
| DE | 102007001025 A1 | 7/2008 |
| DE | 102010011221 A1 | 9/2011 |
| WO | WO0055809 A2 | 9/2000 |
| WO | WO2011110404 A1 | 9/2011 |

OTHER PUBLICATIONS

German Office Action for German Application No. 10 2012 206 651.9, mailed Oct. 20, 2014, with English Translation.
PCT International Search Report and Written Opinion of the International Searching Authority dated Jul. 17, 2013 for corresponding PCT/EP2013/057307.

* cited by examiner

*Primary Examiner* — Michael D Masinick
(74) *Attorney, Agent, or Firm* — Lempia Summerfield Katz LLC

(57) ABSTRACT

A method for controlling a turbine is proposed, which is characterized at any point in the control by a hidden state. The dynamic behavior of the turbine is modeled with a recurrent neural network comprising a recurrent hidden layer. In this case, the recurrent hidden layer is formed from vectors of neurons, which describe the hidden state of the turbine at the time points of the regulation, wherein two vectors are chronologically linked for each time point with a first connection bridging a time and second connection bridging at least two points in time. Short-term effects can be controlled by means of the first connections and long-term effects can be adjusted by means of the second connections. Secondly, emissions and also occurring dynamics in the turbine can be minimized. Furthermore, a regulating device and a turbine with such a regulating device are proposed.

20 Claims, 2 Drawing Sheets

CONTROLLING A TURBINE WITH A RECURRENT NEURAL NETWORK

This application is the National Stage of International Application No. PCT/EP2013/057307, filed Apr. 8, 2013, which claims the benefit of DE 10 2012 206 651.9, filed Apr. 23, 2012. The entire contents of these documents are hereby incorporated herein by reference.

BACKGROUND

The present embodiments relate to the control of a turbine (e.g., a gas turbine or a wind turbine).

A turbine may assume a large number of successive different states during operation. In order to sense these different states, many different sensors are conventionally used to provide sensor values ascertained on the turbine.

On account of the resultant complexity, many known control methods for turbines use neural networks.

An example of such a known method for controlling a turbine using a neural network is described in the patent specification DE 10 2007 001 025 B4.

The control of a turbine involves correcting short-term effects and long-term effects, for example. Short-term effects may be such effects as are based on short or short-term dependencies of the states of the turbine during operation. Control that is suitable for short-term effects in a turbine is known from WO 2011/110404 A1. By contrast, long-term effects may be such effects as are based on long or long-term dependencies of the states of the turbine during operation.

For the example of a gas turbine, uncontrolled or less than optimally controlled long-term effects may cause increased emissions from the gas turbine and also occurring dynamics in the gas turbine.

SUMMARY AND DESCRIPTION

The scope of the present invention is defined solely by the appended claims and is not affected to any degree by the statements within this summary.

The present embodiments may obviate one or more of the drawbacks or limitations in the related art. For example, control for a turbine that may correct short-term effects and long-term effects is provided.

A method for controlling a turbine, such as a gas turbine or a wind turbine, is provided. The turbine has a number of sensors for providing sensor values ascertained on the turbine and a number of actuators for actuating the turbine. The turbine is characterized at each instant from a plurality of chronological instants of the control by a hidden state that may be derived by sensor values and a rating signal for the hidden state and may be influenced by alterable actuator values for the actuators. In act a) of the method, the dynamic behavior of the turbine is modeled with a recurrent neural network including an input layer, a recurrent hidden layer, and an output layer based on training data including sensor values, actuator values and rating signals. In this case, the input layer is formed from first vectors of neurons that describe sensor values and/or actuator values at the instants. In addition, the recurrent hidden layer is formed from second vectors of neurons that describe the hidden state of the turbine at the instants. Chronologically, for all the instants, two respective vectors from the second vectors are connected to a first connection that spans one instant, and, also chronologically, two respective vectors from the second vectors are connected to a second connection that spans at least two instants. In addition, the output layer is formed from at least one third vector of neurons that describes the rating signal or at least one portion of the sensor values and/or at least one portion of the actuator values at the instants.

In act b) of the method, a learning and/or optimization method is performed on the hidden states in order to provide a set of rules having optimized actuator values for each hidden state.

In act c) of the method, the current hidden state is ascertained the recurrent neural network and currently ascertained sensor values from the sensors.

In act d) of the method, current actuator values are ascertained in order to actuate the actuators using the provided set of rules and the current hidden state.

The first connections between the vectors from the second vectors may be used to correct short-term effects, and the second connections may be used to correct long-term effects. The second connections may minimize emissions and also occurring dynamics in the turbine.

Examples of sensor values are the emission values for the turbine, the exhaust temperature for the turbine, and the ambient temperature and ambient pressure.

Examples of actuator values are the inlet guide vane position, the total gas stream and mix ratios that are to be set for the gases.

In one embodiment, the recurrent neural network used is a deployed recurrent neural network.

In a further embodiment, in act a), the output layer is formed from at least one third vector of neurons that describes the rating signal or, exclusively, such sensor values and/or actuator values as influence the rating signal at the instants.

In a further embodiment, apart from the current hidden state at the current instant, all the hidden states at the past and future instants are spanned by a second connection.

In a further embodiment, the second connections are arranged symmetrically about the current hidden state.

In a further embodiment, the recurrent neural network is divided into two subnetworks that are connected by the current hidden state, where the first subnetwork describes the hidden states for past instants, and the second subnetwork describes the hidden states for future instants.

In a further embodiment, the first connections and the second connections are formed by neural structures (e.g., by matrices of weights or neural connections) including matrices and further vectors of neurons.

In a further embodiment, the hidden states in the recurrent hidden layer are connected by weights such that the weights for the future instants differ from the weights for the past instants.

In a further embodiment, a respective length L is set for the second connections, so that a predetermined number N of instants is spanned (N≥2).

In a further embodiment, the length of the second connections is set by a heuristic, where the length L of the second connections is chosen such that the total number of necessary steps for reaching the current hidden state from the hidden states of the past instants is minimal.

In a further embodiment, during the modeling of the dynamic behavior of the turbine, act a) involves the recurrent neural network being trained based on the training data such that the neurons of the third vectors of the output layer are forecast for one or more future instants from one or more past instants.

In a further embodiment, act a) involves the use of a nonlinear activation function for the recurrent neural network.

In a further embodiment, the learning and/or optimization method in act b) is a computer learning method (e.g., a strengthening learning method).

In a further embodiment, the learning and/or optimization method includes dynamic programming and/or prioritized sweeping and/or Q learning and/or a recurrent control neural network (RCNN). By way of example, RCNN is described in the patent specification DE 10 2007 001 025 B4.

In a further embodiment, the rating signal is represented by a rating function that is dependent at least on a portion of the sensor values and/or actuator values.

In a further embodiment, the learning and/or optimization method in act b) uses the rating signals in order to implement the actuator values for an optimum rating signal.

In a further embodiment, the turbine is a gas turbine or a wind turbine.

In a further embodiment, the turbine is a gas turbine. The rating signal is determined at least by an efficiency and/or a pollutant emission of the gas turbine and/or the alternating pressures and/or the mechanical and/or thermal loads on the combustion chamber of the gas turbine.

In a further embodiment, the turbine is a wind turbine, where the rating signal is determined at least by the force loading and/or alternating loading on one or more rotor blades of the wind turbine.

In a further embodiment, in act a), also chronologically, two respective vectors from the second vectors are connected to a third connection that spans at least three instants.

In addition, a computer program product that prompts the performance of the method as explained above on a program-controlled device is provided. The program-controlled device is a computer, for example.

A computer program product such as a computer program device may be provided or supplied by a server in a network, by way of example, as a storage medium, such as a memory card, a USB stick, a CD-ROM, a DVD or else in the form of a downloadable file. This may be accomplished, for example, in a wireless communication network by the transmission of an appropriate file with the computer program product or the computer program device.

In addition, an apparatus for controlling a turbine is provided. The turbine includes a number of sensors for providing sensor values ascertained on the turbine and a number of actuators for actuating the turbine. The actuators are actuated by actuator values. The turbine is characterized at each instant from a plurality of chronological instants of the control by a hidden state. The hidden state may be derived from the sensor values and a rating signal for the hidden state. The hidden state may be influenced by alterable actuator values for the actuators.

The apparatus has a modeling device, a provision device, an ascertainment device and an output device. The modeling device is set up to model the dynamic behavior of the turbine with a recurrent neural network including an input layer, a recurrent hidden layer, and an output layer based on training data including sensor values, actuator values and rating signals. In this case, the input layer is formed from first vectors of neurons that describe sensor values and/or actuator values at the instants. In addition, the recurrent hidden layer is formed from second vectors of neurons that describe the hidden layer of the turbine at the instants. Chronologically, for all the instants, two respective vectors from the second vectors are connected to a first connection that spans one instant. Also chronologically, two respective vectors from the second vectors are connected to a second connection that spans at least two instants. The output layer is formed by the modeling device from at least one third vector of neurons that describe the rating signal or at least one portion of the sensor values and/or at least one portion of the actuator values at the instants.

The provision device is set up to perform a learning and/or optimization method on the hidden states in order to provide a set of rules having optimized actuator values for each hidden state.

The ascertainment device is set up to ascertain the current hidden state using the recurrent neural network and currently ascertained sensor values from the sensors of the turbine.

The output device is set up to ascertain current actuator values for actuating the actuators using the provided set of rules and the current hidden state, and to output the current actuator values to the actuators of the turbine.

The respective devices may be implemented in hardware. Alternatively, the devices may be implemented in software. In the case of a hardware implementation, the respective device may be in the form of an apparatus or in the form of part of an apparatus (e.g., in the form of a computer or in the form of a microprocessor). In the case of a software implementation, the respective device may be in the form of a computer program product, in the form of a function, in the form of a routine, in the form of part of a program code, or in the form of an executable object.

A turbine that includes an apparatus, as explained above, for controlling the turbine is provided.

In addition, a controller that includes a turbine and an apparatus as explained above, for controlling the turbine is provided.

DETAILED DESCRIPTION

In the figures, elements that are the same or have the same function have been provided with the same reference symbols, unless indicated otherwise.

Figure 1:
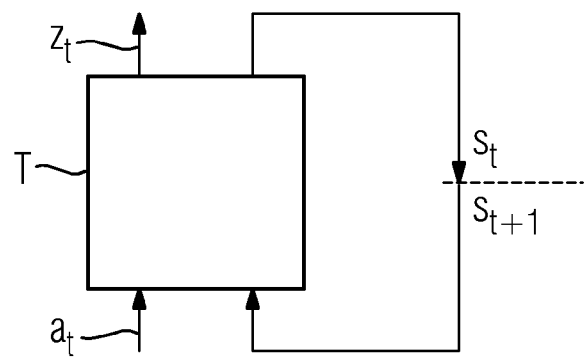
FIG. 1 shows a schematic diagram to illustrate the dynamic behavior of a turbine.

FIG. 1 schematically shows the dynamics of one embodiment of a turbine T. In this case, the turbine T is described at a respective instant t by an observable state $z_t$, which is defined by sensor values ascertained on the turbine T, and an action $a_t$ that is performed on the turbine T. The action $a_t$ on the turbine T is determined by actuator values $a_t$ that the actuators use to actuate the turbine T. The turbine T is determined by internal or hidden states $s_t$ that are not directly observable. In this case, the hidden state $s_t$ changes as a result of changing actuator values $a_t$ and proceeds to the state $s_{t+1}$. The state $s_{t+1}$ is dependent on the actuator values $a_t$ and also on the preceding state $s_t$. In addition, the turbine T is specified by a suitable rating signal $r_t$ (not evident from FIG. 1) that defines the extent to which the action performed in a state of the turbine T may be classified as good by the actuator values $a_t$ with respect to optimum operation of the turbine T. Examples of such rating signals are the pollutant emission of the turbine or the mechanical alternating loading on the turbine during operation. The aim of control of the turbine T is low emission and/or low mechanical loading.

In the present case, suitable modeling of the dynamic behavior of the turbine T is performed taking account of the rating signal $r_t$ based on training data including sensor values, actuator values and rating signals at a plurality of instants t. Details in this regard are discussed with reference to FIGS. 2 and 3 below.

In the text below, the rating signal considered is also a remuneration signal, which may also be a reward and may be as large as possible during operation of the turbine T. It is assumed that the description of the turbine based on the states, sensor values and actuator values is what is known as a Markow decision process, but only the remuneration signal $r_t$ is a relevant piece of information for this decision process. Markow decision processes are described in more detail in documents DE 10 2007 001 025 B4 and WO 2011/110404 A1, for example.

In the present case, the information relevant to the Markow decision process defined by the remuneration $r_t$ is coded into the hidden state $s_t$. Information that is not relevant to the Markow decision process is ignored. To achieve this, the recurrent neural network that is used for modeling the dynamic behavior of the turbine T is designed, for example, such that the recurrent neural network contains sensor values $z_t$ and actuator values $a_t$ that influence the remuneration signal $r_t$ or exclusively the remuneration signal $r_t$ in the output layer O, as will be described in more detail further below (see FIG. 3). A recurrent neural network that may be used for controlling a turbine T is described in WO 2011/110404 A. This neural network may also be called a Markow decision process extraction network (MPEN network).

Figure 2:
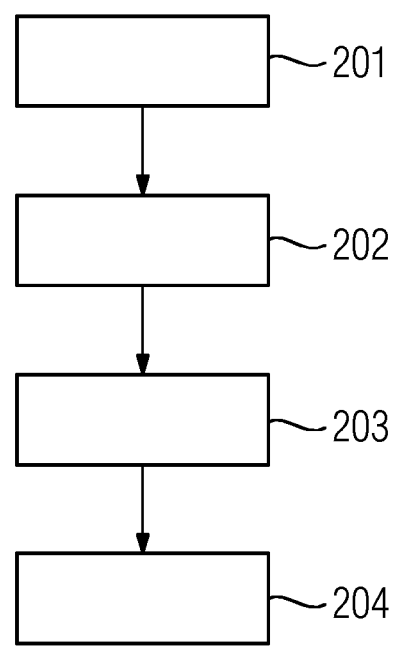
FIG. 2 shows a schematic flowchart for one embodiment of a method for controlling a turbine.

FIG. 2 illustrates a flowchart for an exemplary embodiment of a method for controlling a turbine that has acts 201 to 204. By way of example, the turbine is a gas turbine or a wind turbine. The turbine has a number of sensors for providing sensor values ascertained on the turbine and a number of actuators for actuating the turbine. The turbine is characterized at each instant from a plurality of chronological instants of the control by a hidden state that may be derived by sensor values and a rating signal for the hidden state, and may be influenced by alterable actuator values for the actuators.

In act 201, the dynamic behavior of the turbine is modeled with a recurrent neural network including an input layer, a recurrent hidden layer and an output layer based on training data including sensor values, actuator values and rating signals. In this case, the input layer is formed from first vectors of neurons that describe sensor values and/or actuator values at the instants. In addition, the recurrent hidden layer is formed from second vectors of neurons that describe the hidden state of the turbine at the instants. Chronologically, for all the instants, two respective vectors from the second vectors are connected to a first connection that spans a single instant. Also chronologically, two respective vectors from the second vectors are connected to a second connection that spans at least two instants. In addition, the output layer is formed from at least one third vector of neurons that describe the rating signal or at least one portion of the sensor values and/or at least one portion of the actuator values at the instants.

In act 202, a learning and/or optimization method is performed on the hidden states in order to provide a set of rules having optimized actuator values for each hidden state.

In act 203, the current hidden state is ascertained by the recurrent neural network and currently ascertained sensor values from the sensors.

In act 204, current actuator values for actuating the actuators are ascertained by the provided set of rules and the current hidden state.

Figure 3:
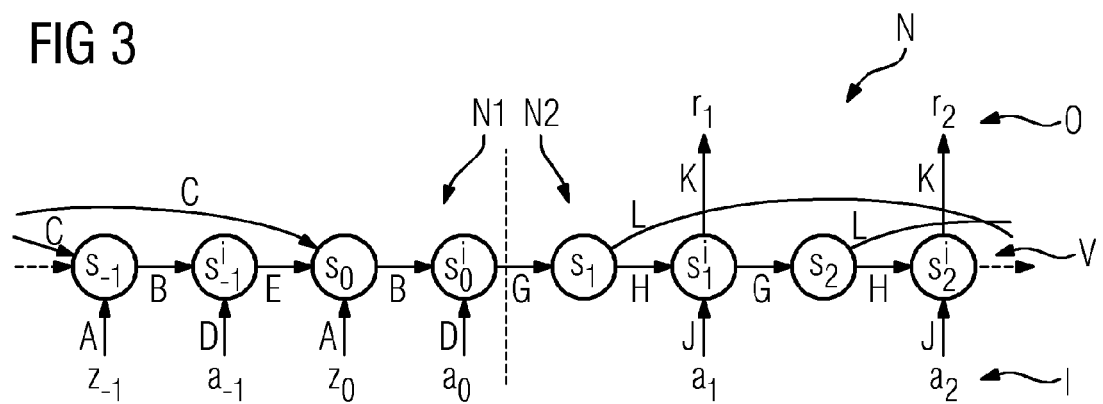
FIG. 3 shows a schematic illustration of one embodiment of a recurrent neural network for modeling the dynamic behavior of a turbine.

The recurrent neural network N described in act 201 is shown in excerpts in FIG. 3. The recurrent neural network in FIG. 3 is a Markow decision process extraction network (MPEN network) with shortcuts C, K in the recurrent hidden layer V that are denoted by C and K in FIG. 3 and may also be referred to as shortcuts. For this reason, the recurrent neural network N in FIG. 3 may also be referred to as an MPEN-S network, the S standing for shortcuts.

The input layer I of the MPEN-S network N in FIG. 3 is denoted by I, the hidden layer is denoted by V, and the output layer is denoted by O.

The input layer I includes sensor values $z_{-1}$, $z_0$ and also actuator values $a_{-1}$, $a_0$, $a_1$, $a_2$. These are used in a suitable manner for the relevant hidden states $s_t$ in the hidden layer V. The subscript indices in FIG. 3 denote the respective instant t. Transition matrices are denoted by respective upper case letters A-E and G, H, J, K and L.

In addition, the remuneration $r_t$ already mentioned above, which is denoted by $r_1$ for the instant t=1 in FIG. 3, is coupled to a hidden state $s_t$ and an action, described by the actuator values $a_t$, that is executed in this hidden state $s_t$.

In this case, FIG. 3 reproduces for the output layer O a remuneration $r_t$ that is to be forecast at the current instant t. The remuneration $r_1$ is therefore valid for the instant t=1, whereas the remuneration $r_2$ is valid for the instant t=2.

In the MPEN-S network N in FIG. 3, there are two different types of connections in the hidden layer V between the individual neurons. There are first connections B, E, G, H that span one instant t. In addition, there are second connections C, K that span at least two instants and represent the aforementioned shortcuts. The term shortcut arises from the circumstance that for an individual time step, a plurality of instants may be spanned using such a shortcut C, K.

FIG. 3 shows that the recurrent neural network N is split into two subnetworks N1, N2. This division of the neural network N in FIG. 3 is shown by the dashed line. The two portions N1 and N2 are connected by the current hidden state $s_0$. In this case, the first subnetwork N1 describes the hidden states $s_{-1}$ for past instants $t_{-1}$, whereas the second subnetwork N2 describes the hidden states $s_1$, $s_2$ for future instants $s_1$, $s_2$. Without restricting the general nature, FIG. 3 shows only one past instant and two future instants.

The second connections C, K are arranged symmetrically about the current hidden state $s_0$. All the hidden states $s_t$ at the past and future instants are spanned by a second connection C, K. The second connections C are used for the past instants, whereas the second connections K are used for the future instants. The current hidden state $s_0$ is not spanned by a second connection C, K.

In addition, FIG. 3 clarifies that in the present case the recurrent neural network N used may be a deployed recurrent neural network N.

The first connections B, E, G, H and the second connections C, K are formed by neural structures (e.g., by matrices of mixed or neural connections).

For example, a respective length L is set for the second connections C, K, so that a predetermined number of instants t is spanned (N≥2).

The length L of the second connections C, K is set by a heuristic. In this case, the length L of the second connections C, K is chosen such that the total number of steps necessary in order to reach the current hidden state $s_0$ from the hidden states $s_{-2}$, $s_{-1}$ of the past instants $t_{-2}$, $t_{-1}$ is minimal.

The matrices in the past A-E may be different from the matrices G, H, J, K, L of the future.

Figure 4:
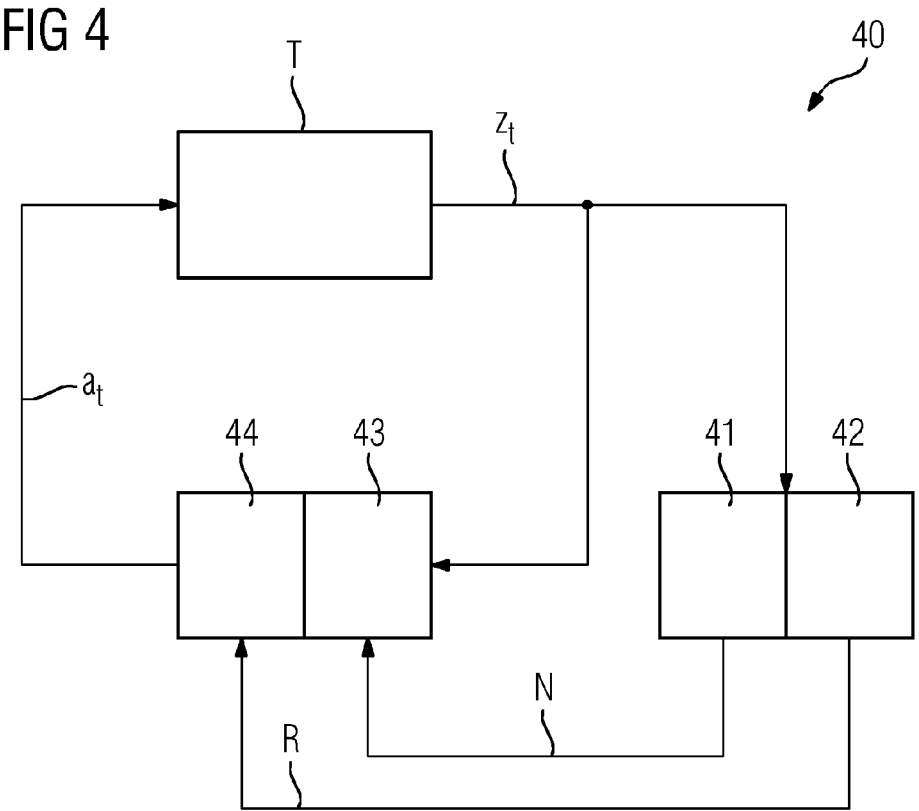
FIG. 4 shows a schematic diagram of one embodiment of an apparatus for controlling a turbine.

FIG. 4 shows a schematic diagram of one embodiment of an apparatus 40 for controlling a turbine T. The turbine T includes a number of sensors for providing sensor values $z_t$ ascertained on the turbine T and a number of actuators for actuating the turbine T (not shown). The actuators are actuated by actuator values $a_t$ (cf., FIG. 1). The turbine T is characterized at each instant t from a plurality of chronological instants of the control by a hidden state $s_t$. The hidden state $s_t$ may be derived from the sensor values $z_t$ and a rating signal $r_t$ for the hidden state $s_t$. The hidden state $s_t$ may be influenced by alterable actuator values $a_t$ for the actuators.

The apparatus 40 has a modeling device 41, a provision device 42, an ascertainment device 43 and an output device 44. The modeling device 41 is set up to model the dynamic behavior of the turbine T with a recurrent neural network N including an input layer I, a recurrent hidden layer V and an output layer O based on training data including sensor values $z_t$, actuator values $a_t$ and rating signals $r_t$ (in this regard, cf. FIG. 3). In this case, the input layer I is formed from first vectors of neurons that describe sensor values $z_t$ and/or actuator values $a_t$ at the instants t. In addition, the recurrent hidden layer V is formed from second vectors of neurons that describe the hidden state $s_t$ of the turbine T at the instants t, where chronologically, for all the instants t, two respective vectors from the second vectors are connected to a first connection B, E, G, H that spans one instant t, and also chronologically, two respective vectors from the second vectors are connected to a second connection C, K that spans at least two instants. The output layer O is formed by the modeling device 41 from at least one third vector of neurons that describe the rating signal $r_t$ or at least one portion of the sensor values $z_t$ and/or at least one portion of the actuator values $a_t$ at the instants t.

The provision device 42 is set up to perform a learning and/or optimization method on the hidden states $s_t$ in order to provide a set of rules R having optimized actuator values $a_t$ for each hidden state $s_t$.

The ascertainment device 43 is set up to ascertain the current hidden state $s_t$ using the recurrent neural network N and currently ascertained sensor values $z_t$ from the sensors of the turbine T.

The output device 44 is set up to ascertain current actuator values $a_t$ for actuating the actuators using the provided set of rules R and the current hidden state $s_t$, and to output the current actuator values $a_t$ to the actuators of the turbine T.

Although the invention has been illustrated and described in more detail by the exemplary embodiments, the invention is not restricted by the disclosed examples. Other variations may be derived therefrom by a person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling a turbine, the turbine comprising a plurality of sensors for providing sensor values ascertained on the turbine and a plurality of actuators for actuating the turbine, the turbine being characterized at each instant from a plurality of chronological instants of control by a hidden state that is derivable by sensor values and a rating signal for the hidden state and is influenceable by alterable actuator values for the plurality of actuators, the method comprising:

modeling dynamic behavior of the turbine with a recurrent neural network comprising an input layer, a recurrent hidden layer, and an output layer based on training data comprising sensor values of the plurality of sensors, actuator values of the plurality of actuators, and rating signals, wherein the input layer is formed from first vectors of neurons that describe sensor values, actuator values, or sensor values and actuator values at the instants, wherein the recurrent hidden layer is formed from second vectors of neurons that describe the hidden state of the turbine at the instants, wherein chronologically, for all the instants, two respective vectors from the second vectors are connected to a first connection that spans one instant, and, chronologically, two respective vectors from the second vectors are connected to a second connection that spans at least two instants, and wherein the output layer is formed from at least one third vector of neurons that describe the rating signal or at least one portion of the sensor values, at least one portion of the actuator values, or the at least one portion of the sensor values and the at least one portion of the actuator values at the instants;

performing a learning method, an optimization method, or a learning and optimization method on the hidden states in order to provide a set of rules having optimized actuator values for each of the hidden states;

ascertaining the current hidden state using the recurrent neural network and currently ascertained sensor values from the plurality of sensors;

ascertaining current actuator values; and actuating the plurality of actuators using the provided set of rules and the current hidden state.

2. The method of claim 1, wherein the recurrent neural network is a deployed recurrent neural network.

3. The method of claim 1, wherein apart from the current hidden state at a current instant, all the hidden states at past and future instants are spanned by a second connection.

4. The method of claim 1, wherein the second connections are arranged symmetrically about the current hidden state.

5. The method of claim 1, wherein the recurrent neural network is divided into two subnetworks that are connected by the current hidden state, and wherein a first subnetwork of the two subnetworks describes the hidden states for past instants, and a second subnetwork of the two subnetworks describes the hidden states for future instants.

6. The method of claim 3, wherein the first connections and the second connections are formed by neural structures comprising matrices and further vectors of neurons.

7. The method of claim 3, wherein a respective length L is set for the second connections, so that a predetermined number of instants is spanned.

8. The method of claim 7, wherein the length of the second connections is set by a heuristic, and
wherein the length of the second connections is chosen such that a total number of necessary steps for reaching the current hidden state from the hidden states of the past instants is minimal.

9. The method of claim 1, wherein the learning method, the optimization method, or the learning and optimization method is a computer learning method.

10. The method of claim 9, wherein the learning method, the optimization method, or the learning and optimization method comprises dynamic programming, prioritized sweeping, Q learning, a recurrent control neural network (RCNN), or any combination thereof.

11. The method of claim 1, wherein the rating signal is represented by a rating function that is dependent at least on a portion of the sensor values, the actuator values, or the sensor values and the actuator values.

12. The method of claim 1, wherein the learning method, the optimization method, or the learning and optimization method uses the rating signals in order to implement the actuator values for an optimum rating signal.

13. The method of claim 1, wherein the turbine is a gas turbine,
wherein the rating signal is determined at least by an efficiency of the gas turbine, a pollutant emission of the gas turbine, or the efficiency and the pollutant emission of the gas turbine, alternating pressures, mechanical, thermal, or mechanical and thermal loads on a combustion chamber of the gas turbine, or any combination thereof.

14. The method of claim 1, wherein the turbine is a wind turbine, and
wherein the rating signal is determined at least by force loading, alternating loading, or force loading and alternating loading on one or more rotor blades of the wind turbine.

15. A computer program product having a program code stored on a non-transitory machine-readable medium and executable by a computer to control a turbine, the turbine comprising a plurality of sensors for providing sensor values ascertained on the turbine and a plurality of actuators for actuating the turbine, the turbine being characterized at each instant from a plurality of chronological instants of control by a hidden state that is derivable by sensor values and a rating signal for the hidden state and is influenceable by alterable actuator values for the plurality of actuators, the program code including instructions comprising:

modeling dynamic behavior of the turbine with a recurrent neural network comprising an input layer, a recurrent hidden layer, and an output layer based on training data comprising sensor values of the plurality of sensors, actuator values of the plurality of actuators, and rating signals, wherein the input layer is formed from first vectors of neurons that describe sensor values, actuator values, or sensor values and actuator values at the instants, wherein the recurrent hidden layer is formed from second vectors of neurons that describe the hidden state of the turbine at the instants, wherein chronologically, for all the instants, two respective vectors from the second vectors are connected to a first connection that spans one instant, and, chronologically, two respective vectors from the second vectors are connected to a second connection that spans at least two instants, and wherein the output layer is formed from at least one third vector of neurons that describe the rating signal or at least one portion of the sensor values, at least one portion of the actuator values, or the at least one portion of the sensor values and the at least one portion of the actuator values at the instants;

performing a learning method, an optimization method, or a learning and optimization method on the hidden states in order to provide a set of rules having optimized actuator values for each of the hidden states;

ascertaining the current hidden state using the recurrent neural network and currently ascertained sensor values from the plurality of sensors;

ascertaining current actuator values; and actuating the plurality of actuators using the provided set of rules and the current hidden state.

16. The computer program product of claim 15, wherein the recurrent neural network is a deployed recurrent neural network.

17. The computer program product of claim 16, wherein apart from the current hidden state at a current instant, all the hidden states at past and future instants are spanned by a second connection.

18. The computer program product of claim 17, wherein the second connections are arranged symmetrically about the current hidden state.

19. The method of claim 6, wherein the neural structures comprise matrices of weights or neural connections.

20. The method of claim 9, wherein the computer learning method is a strengthening learning method.

* * * * *